United States Patent [19]

Lefevre

[11] 3,903,212

[45] Sept. 2, 1975

[54] FAN-ASSISTED COOLING TOWER AND METHOD OF OPERATION

[75] Inventor: Marcel R. Lefevre, Bernardsville, N.J.

[73] Assignee: Research-Cottrell, Inc., Somerset, N.J.

[22] Filed: July 10, 1973

[21] Appl. No.: 377,928

[52] U.S. Cl.............. 261/30; 261/64 R; 261/111; 261/DIG. 11
[51] Int. Cl.$^2$........................................ B01F 3/04
[58] Field of Search..... 261/30, 64 R, 111, DIG. 11, 261/22, 91; 49/388, 425

[56] References Cited
UNITED STATES PATENTS

| | | | |
|---|---|---|---|
| 1,098,002 | 5/1914 | Wilson | 261/DIG. 11 |
| 2,463,250 | 2/1949 | Curtiss, Jr. | 49/425 X |
| 2,680,603 | 6/1954 | Taylor | 261/22 |
| 2,972,788 | 2/1961 | Shean | 49/388 X |
| 3,189,329 | 6/1965 | Smith et al. | 261/DIG. 11 |
| 3,243,166 | 3/1966 | Osenga et al. | 261/DIG. 11 |
| 3,293,801 | 12/1966 | Henning | 49/425 X |
| 3,318,586 | 5/1967 | Meredith | 261/30 |
| 3,608,873 | 9/1971 | Furlong | 261/111 X |
| 3,767,177 | 10/1973 | Engalitcheff, Jr. et al. | 261/DIG. 11 |

Primary Examiner—Tim R. Miles
Assistant Examiner—Richard L. Chiesa
Attorney, Agent, or Firm—Harold L. Stowell

[57] ABSTRACT

Apparatus and the method of operating same, for withdrawing waste heat from industrial plants and particularly for condensing steam or other condensable fluids exhausting from condensable fluid driven turbines in a fan-assisted wet, dry or wet and dry air cooled tower wherein the fans are located outside of the tower with the fan shafts positioned in a generally vertical direction so that the entire interior of the tower may be utilized for maximum liquid cooling and the fans are readily accessible but protected from wind destruction.

7 Claims, 7 Drawing Figures

FAN-ASSISTED COOLING TOWER AND METHOD OF OPERATION

Related subject matter is disclosed and claimed in my co-pending application Ser. No. 356,721, U.S. Pat. No. 3,865,911 filed May 3, 1973, entitled "Cooling Tower Type Waste Heat Extraction Method and Apparatus".

BACKGROUND OF THE INVENTION

Fan-assisted natural draft cooling towers are known and such towers are becoming one of the principal modes of withdrawing waste heat from industrial plants and in particular for withdrawing waste heat from condenser cooling water exhausting from steam and the like condensable fluid turbine driven power generating stations. While water cooling of steam powered electrical generating plant condensers, with the water being taken from rivers and wells, was once an important cooling practice, the shortage of water and thermal pollution of rivers and streams has substantially reduced such practice and air cooling of hot water is being employed in an increasing number of new and remodelled power generating stations.

A number of different types of fan-assisted natural draft cooling towers have been designed, constructed and used. In one form the fans have been mounted within the tower, however, with such an arrangement the fans are utilizing tower space needed for heat exchange purposes and in order to accommodate the fans the tower size must be increased. Further, the fans are located in a zone of accelerated corrosion, and the fans and drive mechanism therefor are located in an area having poor accessibility for repair and maintenance. Further, with the fan mounted within the tower they form flow restrictions to natural draft operations of the tower.

To overcome some of these disadvantages, fan-assisted natural draft cooling towers have been constructed with the fan mechanism located externally of the tower and about its base with fan shafts positioned in a horizontal direction or in a generally horizontal direction. Such arrangements place the fans in general in a more accessible position for repair and maintenance. However, with the fan shafts located in a horizontal position the fans are directly subject to adverse effects of wind which limits the size of the fan by the risk of destruction by high winds and the size of the fans are limited by the pumping head for water pumps for the system. Further, the fans placed externally with horizontal fan shafts, the maximum tower size is restricted by the number of fans that can be installed around the base of the tower which limits the size and number thereof in proportion to the tower diameter whereas the area employed for tower fill is proportional to the square of the tower's diameter.

GENERAL DESCRIPTION OF THE PRESENT INVENTION

The present invention is generally directed to fan-assisted natural draft cooling towers and methods of operating same for withdrawing waste heat from industrial plants wherein the fans are located externally of the tower with the fan shafts positioned in a generally vertical direction so that the entire interior of the tower may be utilized for maximum liquid cooling and the fans are readily accessible but protected from wind destruction.

The invention may be defined as a fan-assisted cooling tower comprising a tower having an upper air discharge, a cooling liquid sump at the lower end of the tower, at least one fan housing external of the tower and connected thereto by an air flow passage above the normal liquid level of cooling liquid maintainable in the liquid sump, a fan shroud formed in the top wall of each said at least one fan housing, and a fan positioned in the shroud with its axis of rotation positioned vertically; and by the method of withdrawing waste heat from industrial plants in a fan-assisted natural draft cooling tower comprising: directing hot cooling liquid to an open top cooling tower, distributing the hot cooling liquid to air contact cooling means, forcing air from a peripheral zone about the tower generally downwardly thence axially into a zone adjacent the tower base, into contact with the air contact cooling means and upwardly through the tower, and withdrawing cooled cooling liquid from the lower end of the tower.

OBJECTS OF THE INVENTION

It is an object of the present invention to provide a mounting system and arrangement for a fan-assisted natural draft cooling tower wherein the mechanical equipment for the tower fans is in the ambient air, easily accessible for inspection and maintenance and not subject to the corrosive action of the water or other liquid being cooled.

It is a further object to provide such apparatus and system wherein the cooling tower is not limited as to fan capacity.

A further object of the present invention is to provide such a system having improved natural draft performance and such a system wherein motors for the fans can be located directly in the fan stacks eliminating the need for long power transmission shafts in order to locate the electric motors in ambient atmosphere and remote from the hot, wet and highly corrosive environment of the cooling tower.

A further object is to provide such a system having reduced water and fan noises and an arrangement wherein the fans, while being in the ambient atmosphere, are relatively protected from wind destruction.

BRIEF DESCRIPTION OF THE DRAWINGS

The invention will be more specifically described in reference to the accompanying drawings wherein.

SPECIFIC DESCRIPTION OF ILLUSTRATED EMBODIMENTS

Figure 1:
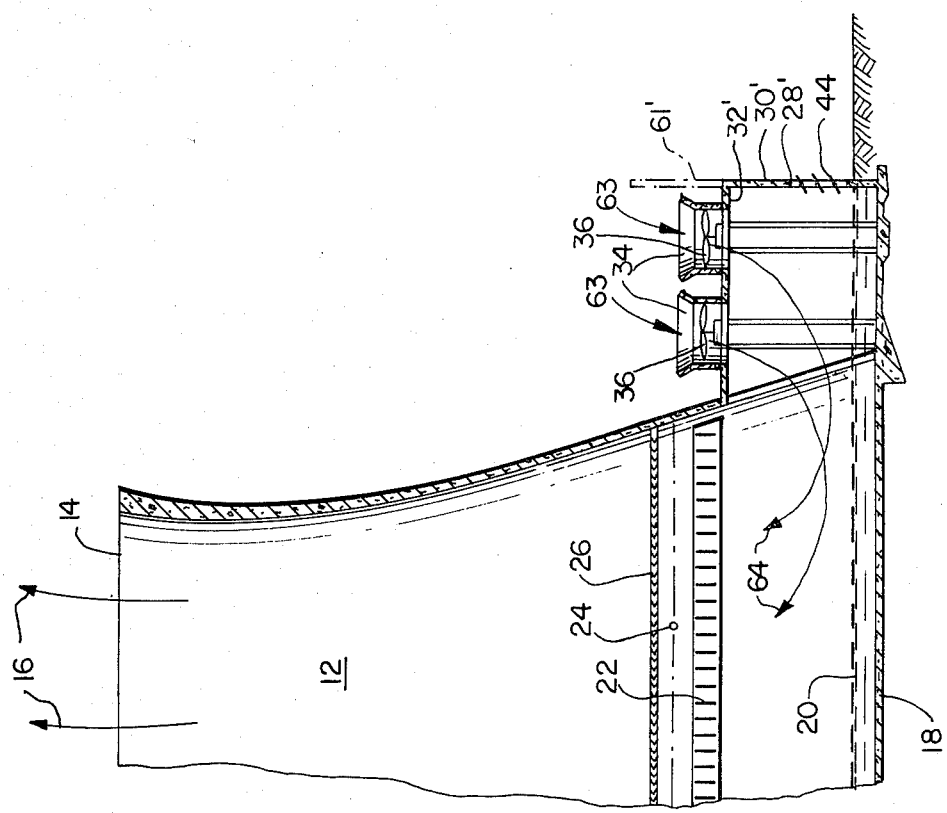
FIG. 1 is a fragmentary vertical sectional view through a counter flow wet type air cooled fan-assisted natural draft cooling tower incorporating the principals of the present invention.
Figure 3:
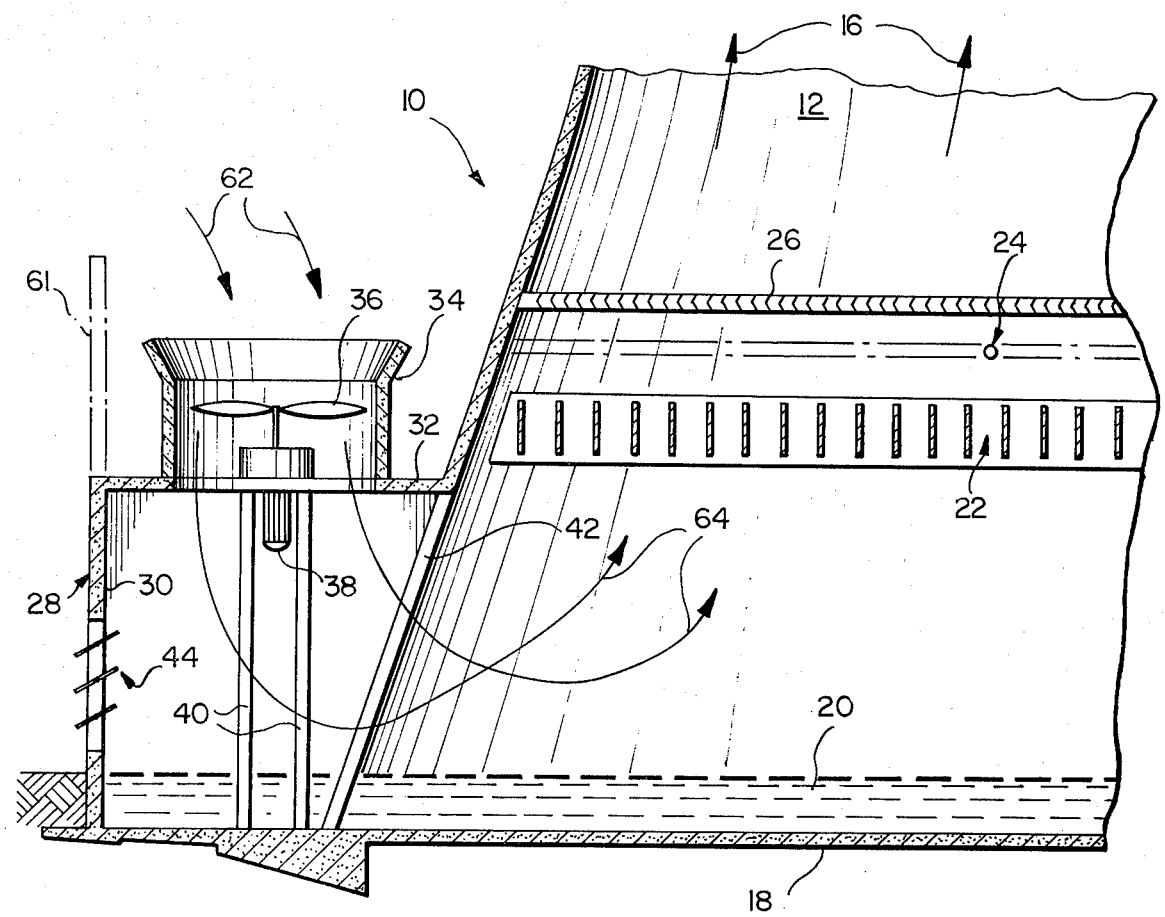
FIG. 3 is an enlarged fragmentary partial sectional view of a portion of the apparatus illustrated in FIG. 1.

Referring to the drawings and particularly to FIGS. 1 and 3 thereof, 10 generally designates a fan-assisted cooling tower system including a natural draft tower 12 having an open discharge end 14 for cooling air, the flow path of which is shown by directional arrows 16. The lower end of the tower 12 contains a sump or basin 18 having a pool of cooling liquid 20 maintained therein. Within the tower and above the pool of cooling liquid 20 is the packing or filling 22 where the major heat exchange takes place between the cooling air and the water to be cooled.

The water to be cooled is directed to the filling or packing 22 via distribution conduits generally designated 24. Above the liquid distribution conduits 24 is a drift or hook eliminator 26 which removes particles and droplets of water from the airstream as it passes upwardly in the tower 12.

Positioned externally of the tower 12 and spaced peripherally thereabout is a housing generally designated 28 which includes a vertical wall 30 and a top wall 32. The top wall supports a plurality of fan shrouds 34 within each of which is mounted a fan 36 and a motor and control means 38. The motor and the fan are suitably supported on vertical support members 40.

It will be noted that a portion of the external wall of the tower 12 is omitted adjacent the fan housing 28, as at 42, for reasons that will become apparent hereinafter. Further, a portion of the vertical wall 30 is fitted with suitable air control louvers or the like 44 so that when desired the louvers may be opened and the cooling tower operated as a natural draft cooler. Also illustrated in FIG. 1 is a conventional steam turbine 46, the exhaust steam from which passes to a condenser 48 via conduit 50 and condensed fluid from the condenser 48 is directed to a boiler or superheater not shown via conduit 52 and heated or superheated steam is directed from the boiler to the turbine 46 via conduit 54. The condenser 48 is cooled by the cooling liquid 20 pumped from the pool or sump 18 via pump 56 and conduit 58. The heated liquid is directed to the fluid distribution conduits 24 via conduit 60.

Further, as illustrated the wall 30 may be extended upwardly above the top 32 of the fan housing as illustrated by broken lines at 61. The upwardly extending wall 61 performs two functions. Firstly, it reduces fan noises and secondly, provides added protection to the fan from winds.

Water or other cooling medium to be cooled is directed to the distribution pipes 24 so that it falls onto the fill of packing 22 and then into the sump 18. With the louvers 44 closed and the fan 36 in operation ambient air is drawn into the fan shroud 34 as illustrated by directional arrows 62 thence downwardly, horizontally, and then upwardly through the packing as shown by directional arrows 64. In passing through the packing or fill, which is wetted by the liquid to be cooled, heat exchange between the air and the liquid takes place lowering the liquid's temperature. Thence the heated air passes about the fluid distribution conduits 24, past the drift or hook eliminator 26 to discharge into the atmosphere from the upper end of the tower 12.

It will be noted from the foregoing description that since the fans 36 are not positioned directly to the wind's action there is no reason to limit the size of the fans to avoid the risk of fan destruction by direct wind action. Further it will be noted that each of the fans and their drive mechanism is located outside of the tower and remote from the corrosive action of the liquid being cooled at locations where service and maintenance of the fan equipment can be readily carried out. Further, it will be recognized by those skilled in the art that both falling water noise and fan noise are much reduced by the presence of wall 28 and its extension 61. Further, with the fans located on the upper wall 32 of the housing 28 natural draft performance of the tower 12 with the fans shut down and the louvers 44 open is functionally ideal as entrance of the cooling air is not hindered by fan and fan drive mechanism.

As hereinbefore set forth, with the fans located peripherally about the tower there are substantially no limitations as to size and number of fans which can be employed at any particular installation.

Figure 2:
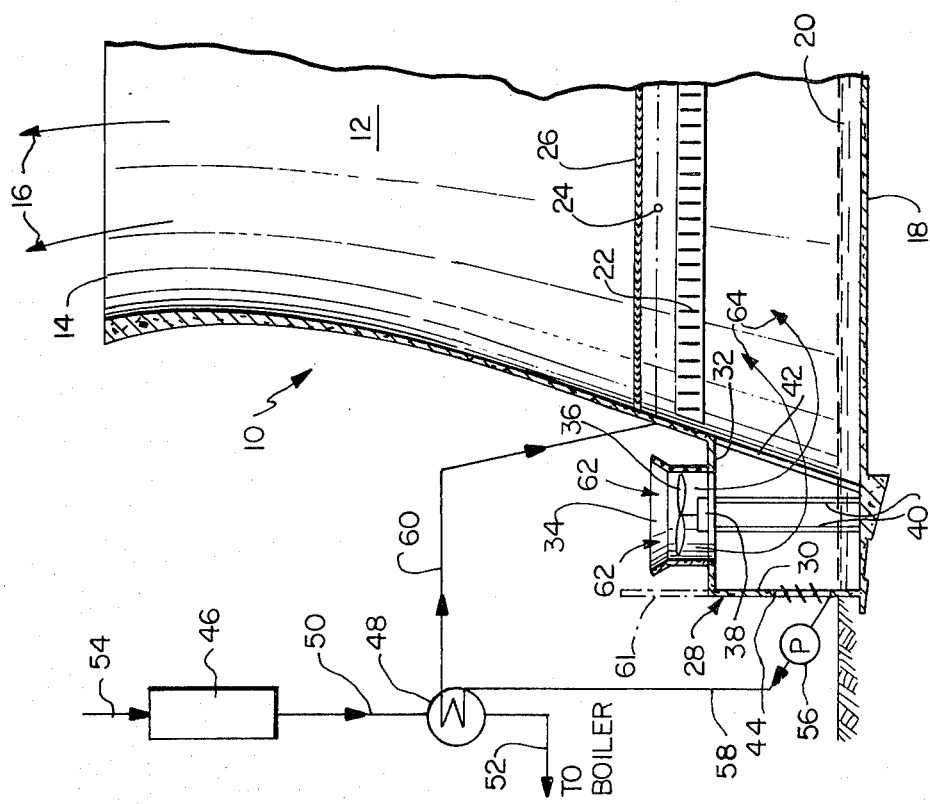
FIG. 2 is a view similar to FIG. 1 of a modified form of the present invention.

Referring now to FIG. 2, an arrangement similar to that shown in FIG. 1 except that concentric rows of fans are illustrated. In the arrangement in FIG. 2 identical structures are provided with the same reference characters as employed in FIGS. 1 and 3. In FIG. 2 the peripherally arranged fan housing 28' includes a vertical wall 30' and a top wall 32' which top wall mounts in tandem arrangement the pair of fan shrouds 34 each of which has mounted therein a fan 36. The wall 29' may include an upper extension 61' as discussed in reference to FIGS. 1 and 3 of the drawings. It will be particularly noted that the number and size of the housing 28' can be materially increased so that larger and a greater number of air cooling fans may be installed on its top wall.

Figure 5:
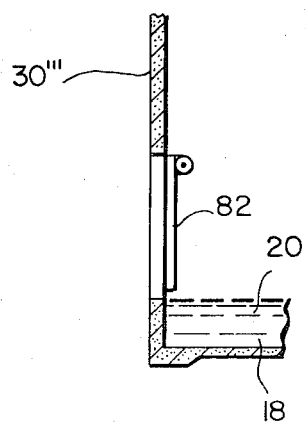
FIG. 5 is a view similar to that shown in FIG. 4 of a further modified form of a part of the apparatus of the present invention.
Figure 4:
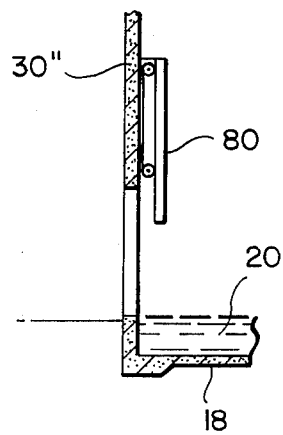
FIG. 4 is an enlarged fragmentary sectional view of the modified form of natural draft flow control means.

In each of the FIGS. 1, 2 and 3, the vertical walls 30 or 30' have conventional louvers 44 so that the cooling tower may be operated by natural draft. The louvers 44 may be connected to electric motors and controllers which would automatically open the louvers when the fans 36 are inoperative.

Where desired, and as shown in FIGS. 4 and 5, the louvers 44 may be replaced by a sliding door 80, FIG. 4, in vertical wall 30'' or a roll-type door 82 as shown in FIG. 5 in vertical wall 30'''. It will also be appreciated that other forms of closure means may be provided for the opening for operation of the tower in the natural draft sequence and that the louvers or sliding or rolling doors or other devices can be opened either manually or by remote control operation to provide free access of air to the tower. Further, automatic louvers controlled by the draft itself can be used in the tower even though such draft opening louvers create some pressure drop and such louvers have the inconvenience of being openable by wind.

Figure 6:
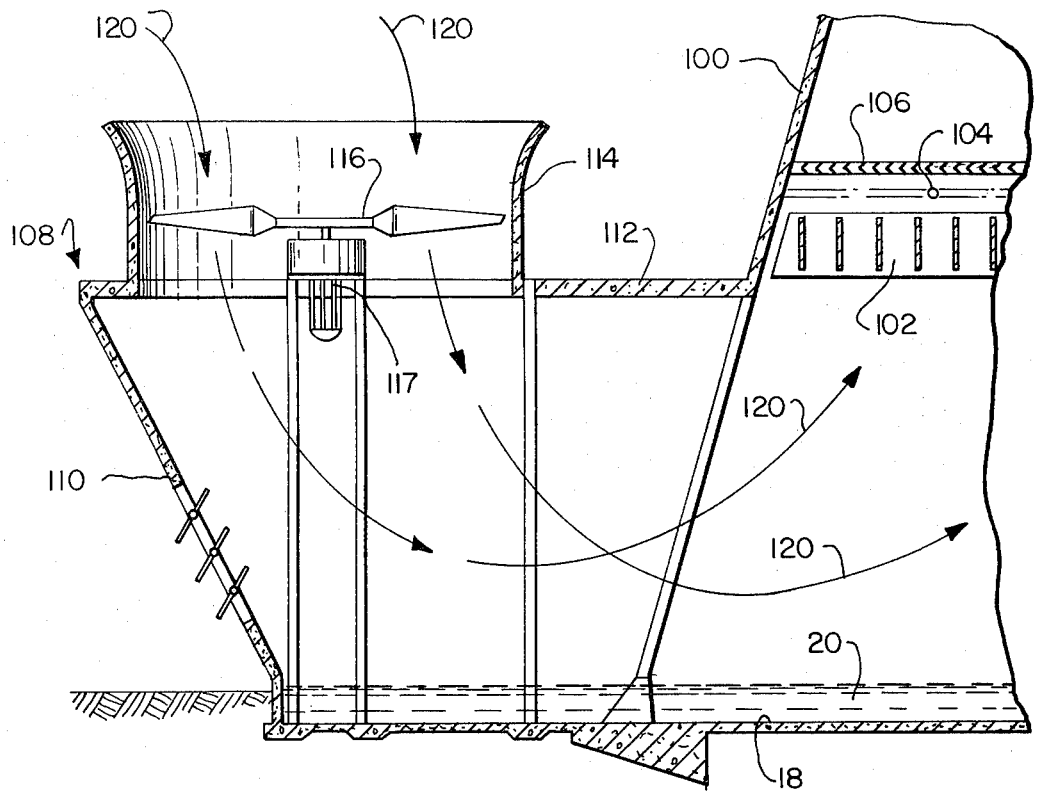
FIG. 6 is a view similar to that shown in FIG. 3 of a further modified form of the present invention.

Referring now to FIG. 6, a modified form of the present invention is illustrated wherein the cooling tower 100 is provided internally with filling 102, liquid distribution conduit means 104 and drift eliminator 106. Below the tower is the sump 18 containing the cooled liquid 20. Mounted externally and peripherally about the base of the tower is the fan housing 108 having a sloping peripheral wall 110 and a top wall 112 which carries the fan shroud 114 and within which the fan 116 and its motor and gear means 117 are mounted.

The FIG. 6 form of the invention is particularly advantageous where there is restricted space about the periphery of the tower and further the sloping wall 110 assists in favorable flow of the fan inducted cooling air as shown by the directional arrows 120.

Figure 7:
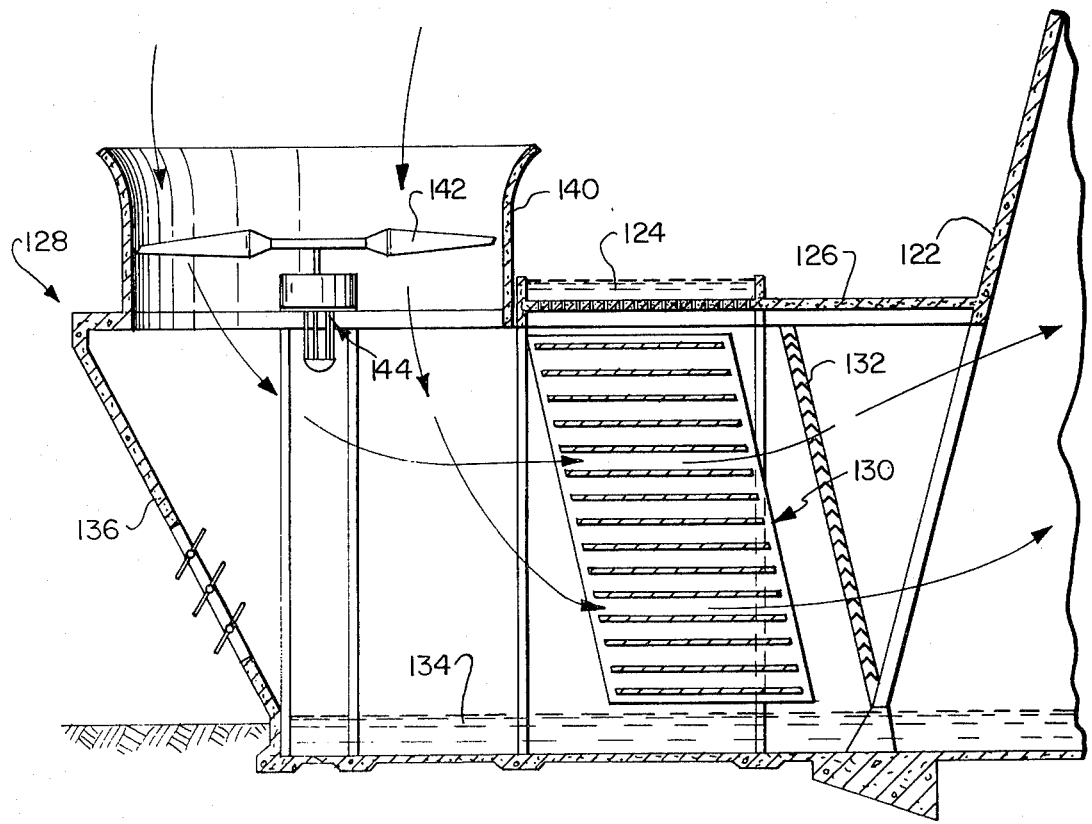
FIG. 7 is a view similar to that shown in FIG. 6 of the fans arranged with cross-flow type packing.

A further modified form of cooling tower is shown in FIG. 7 incorporating the features of the present invention. In FIG. 7 the tower 122 is of the type wherein the entire interior of the tower is open for natural air flow and the liquid to be cooled is distributed to a trough 124 mounted in the top 126 of the fan housing generally designated 128. The liquid in the trough 124 is distributed downwardly to the horizontal packing or filling generally designated 130 and air having passed the filling then flows through a drift or hook eliminator 132. Cooled liquid having its waste heat removed therefrom by the flow of air past the wetted filling or packing 130 is collected in the sump or pool 134 from which it is pumped for further use. The fan housing 128 in this form of the invention also has a sloping support wall 136, a fan shroud 140, fan 142 and gear and motor controls for the fan 144. This form of the invention may also include louvered or otherwise openable and closeable passages in the sloping wall 136 whereby the tower can be operated solely on natural draft where cooling requirements so dictate.

From the foregoing description of various forms of the present invention, it will be appreciated by those skilled in the art that the objects and advantages hereinbefore set forth are fully accomplished.

I claim:

1. A fan-assisted natural draft chimney type cooling tower comprising a chimney tower composed of a substantially cylindrical vertical wall enclosure provided with an open upper air discharge end and a closed ground situated lower end, a cooling liquid sump within the lower end of said tower wall enclosure, at least one fan housing peripherally mounted about the lower end of said wall enclosure of said tower and composed of a top wall laterally outstanding from the wall enclosure and substantially disposed and an outer vertical side wall depending from the top wall, a fan shroud vertically formed in the top wall of each said at least one fan housing, a fan operatively positioned in said shroud with its axis of rotation positioned vertically, said wall enclosure being provided with an opening opposite the vertical wall of the fan housing and defining an air passage communicating the fan housing with the interior of said tower above the normal liquid level of cooling liquid maintainable in said liquid sump, said outer vertical side wall of the fan housing having selectively operable controllable louver means to selectively connect the interior of the tower with ambient atmosphere bypassing said fan, extended gas and liquid contact surfaces in said tower above the air flow passage, and means for directing liquid to be cooled to the upper ends of the contact surfaces to thereby provide for counter-flow arrangement of liquid to be cooled and air.

2. The invention of claim 1, including a plurality of fan housings arranged around the lower end of the wall enclosure and communicated with the interior thereof and each containing a vertically oriented fan.

3. The invention of claim 2 wherein the fans are positioned in a pair of concentric paths peripherally about the lower end of said wall enclosure.

4. The invention of claim 2 wherein the fans are positioned in a circular path peripherally about the lower end of the wall enclosure.

5. The invention of claim 1 wherein the outer vertical side wall of the fan housing is perpendicular to the ground surface.

6. The invention of claim 1 wherein the outer vertical side wall of the fan housing is sloped inwardly toward the wall enclosure.

7. The invention of claim 1 wherein the outer vertical side wall of the fan housing has an upstanding vertical extension that extends upwardly alongside of the fan shroud.

* * * * *

UNITED STATES PATENT OFFICE
CERTIFICATE OF CORRECTION

PATENT NO. : 3,903,212
DATED : September 2, 1975
INVENTOR(S) : Marcel R. Lefevre It is certified that error appears in the above-identified patent and that said Letters Patent are hereby corrected as shown below:

Claim 1, column 5 in line 38 the word "horizontally" is inserted between the words "substantially disposed".

Signed and Sealed this fourth Day of November 1975

[SEAL]

Attest:

RUTH C. MASON
Attesting Officer

C. MARSHALL DANN
Commissioner of Patents and Trademarks